(12) United States Patent
Rogers et al.

(10) Patent No.: US 8,087,181 B2
(45) Date of Patent: Jan. 3, 2012

(54) VALVE BODY SEAT POCKET INSPECTION TOOL

(75) Inventors: Robert N. Rogers, Tomball, TX (US); Rick C. Hunter, Friendswood, TX (US)

(73) Assignee: Vetco Gray Inc., Houston, TX (US)

( * ) Notice: Subject to any disclaimer, the term of this patent is extended or adjusted under 35 U.S.C. 154(b) by 126 days.

(21) Appl. No.: 12/140,921

(22) Filed: Jun. 17, 2008

(65) Prior Publication Data

US 2009/0307918 A1 Dec. 17, 2009

(51) Int. Cl.
*G01D 5/20* (2006.01)
*G01D 5/00* (2006.01)
*G01D 21/00* (2006.01)

(52) U.S. Cl. ............................ 33/654; 33/611
(58) Field of Classification Search ................ 33/199 R, 33/199 B, 542, 542.1, 543, 607, 611, 654; 73/114.79
See application file for complete search history.

(56) References Cited

U.S. PATENT DOCUMENTS

| | | | | |
|---|---|---|---|---|
| 2,521,966 A * | 9/1950 | Clayborne | ....................... | 33/611 |
| 3,893,836 A * | 7/1975 | Rough | .............................. | 65/164 |
| 4,030,201 A * | 6/1977 | Possati et al. | ................... | 33/504 |
| 4,034,478 A * | 7/1977 | Yager | ............................... | 33/611 |
| 4,610,090 A * | 9/1986 | Brady | ............................... | 33/797 |
| 4,888,877 A | 12/1989 | Enderle et al. | | |
| 4,993,169 A * | 2/1991 | Foster et al. | ...................... | 33/783 |
| 5,012,685 A * | 5/1991 | Lackman | ...................... | 73/866.5 |
| 5,226,240 A * | 7/1993 | Stark | ................................ | 33/542 |
| 5,251,154 A * | 10/1993 | Matsumoto et al. | .......... | 702/168 |
| 6,155,108 A | 12/2000 | Lunn | | |
| 7,104,121 B2 * | 9/2006 | Firmin et al. | ............... | 73/114.79 |
| 7,171,332 B2 * | 1/2007 | Kosiorek et al. | .............. | 702/166 |
| 2007/0240318 A1* | 10/2007 | Matsumiya et al. | ......... | 33/199 R |
| 2008/0304071 A1* | 12/2008 | Kallmann | ...................... | 356/450 |

FOREIGN PATENT DOCUMENTS

| | | | |
|---|---|---|---|
| DE | 4415582 A1 | * | 11/1995 |
| DE | 19859679 A1 | * | 6/2000 |
| JP | 10281733 A | * | 10/1998 |

(Continued)

OTHER PUBLICATIONS

PCT/US2009/047470, Search Report and Written Opinion, May 10, 2010.

*Primary Examiner* — R. A. Smith
(74) *Attorney, Agent, or Firm* — Bracewell & Giuliani LLP

(57) ABSTRACT

A technique is provided for detecting the surface profile of a seat pocket of a gate valve. An inspection tool is used to detect data at a plurality of points around the bore of the valve. The inspection tool has a sensor that is moveable between a retracted position and an extended position. The inspection tool is disposed within a valve body cavity with the sensor in the retracted position. The sensor of the inspection tool is then extended outward so that it is located within the portion of the bore of the valve having the surface profile to be detected. The sensor is rotated so that the sensor may obtain surface profile data at a plurality of points around the seat pocket of the valve body. The sensor of the inspection tool is connected to a processor-based device, such as a computer. The processor-based device processes the data from the sensor and provides it to a user in a form that is recognizable to the user.

10 Claims, 8 Drawing Sheets

FOREIGN PATENT DOCUMENTS

| | | | |
|---|---|---|---|
| JP | 11081935 A | * | 3/1999 |
| JP | 2000298012 A | * | 10/2000 |
| JP | 2000298015 A | * | 10/2000 |
| WO | WO 9525939 A1 | * | 9/1995 |
| WO | 0227270 A | | 4/2002 |
| WO | 2008129305 A | | 10/2008 |

* cited by examiner

- Prior Art -

VALVE BODY SEAT POCKET INSPECTION TOOL

BACKGROUND

The invention relates generally to measurement tools. In particular, the invention relates to a tool for measuring the surface profile of a valve seat pocket.

A valve is a device that regulates the flow of a material by opening, closing, or partially obstructing a path though the valve. The material flowing through the valve may be a gas, a liquid, a fluidized solid, or slurry. There are a variety of different types of valves, such as gate valves and globe valves.

A valve typically consists of several parts, such as a valve body, a bonnet, a valve member, and a valve seat. The valve body and the bonnet form the casing that contains and directs material through the valve. For example, the valve body may have a bore that extends through the valve body. The valve member interacts with the valve body to control the flow of material passing through the valve. The valve member may be positioned to close or restrict flow through the valve body. For example, a sliding gate may be used as a valve member. The sliding gate may have an opening through the gate so that when the opening is aligned with the bore through the valve body, fluid flow through the bore is enabled. Alternatively, the gate may be positioned so that a solid portion of the gate is aligned with the passage through the valve body, thereby blocking flow through the passage. The valve member is located in a cavity in the valve body that is covered by the bonnet. The bonnet also supports the valve member. During manufacture, the internal parts of the valve are put into the valve body and then the bonnet is attached to hold the valve parts together. The bonnet is removed to provide access to the internal parts of the valve during maintenance.

In a gate valve, the valve seat is the interior surface in the valve body that contacts the gate to form a seal. The gate comes into contact with the seat when the valve is shut. The body and the seat could both come in a single piece of solid material. Alternatively, the seat could be a separate valve part that is attached or fixed to a seat pocket on the inside of the valve body.

When the seat is a separate valve part, the dimensions of the seat and seat pocket must correspond or the seat will not sit properly within the seat pocket of the valve body. As a result, the gate and seat may not properly seal when the valve is closed. In this event, leakage through the valve may occur.

Unfortunately, the dimensions of seat pockets are not easy to measure. Seat pockets typically are cylindrically-shaped regions formed in the passage through the valve body. The roundness of the seat pocket, as well as other surface properties, is difficult to measure or is time-consuming using conventional tools, such as calipers.

Therefore, a more effective technique for establishing the surface properties of a seat pocket of a valve is desired. In particular, a technique is needed to detect the smoothness and roundness of a seat pocket of a bore of a gate valve.

BRIEF DESCRIPTION

A technique is provided for detecting the surface profile of a seat pocket in a bore of a gate valve. An inspection tool is used to detect data at a plurality of points around the seat pocket of the valve. The inspection tool has a sensor that is moveable between a retracted position and an extended position. The inspection tool is disposed within a valve cavity of a valve with the sensor in the retracted position. The sensor of the inspection tool is then extended outward so that the sensor is located within the seat pocket of the valve having the surface profile to be detected. The sensor is rotated so that the sensor may obtain surface profile data at a plurality of points around the seat pocket of the valve. The sensor of the inspection tool is connected to a processor-based device, such as a computer. The processor-based device processes the data from the sensor and provides it to a user in a form that is recognizable to the user.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
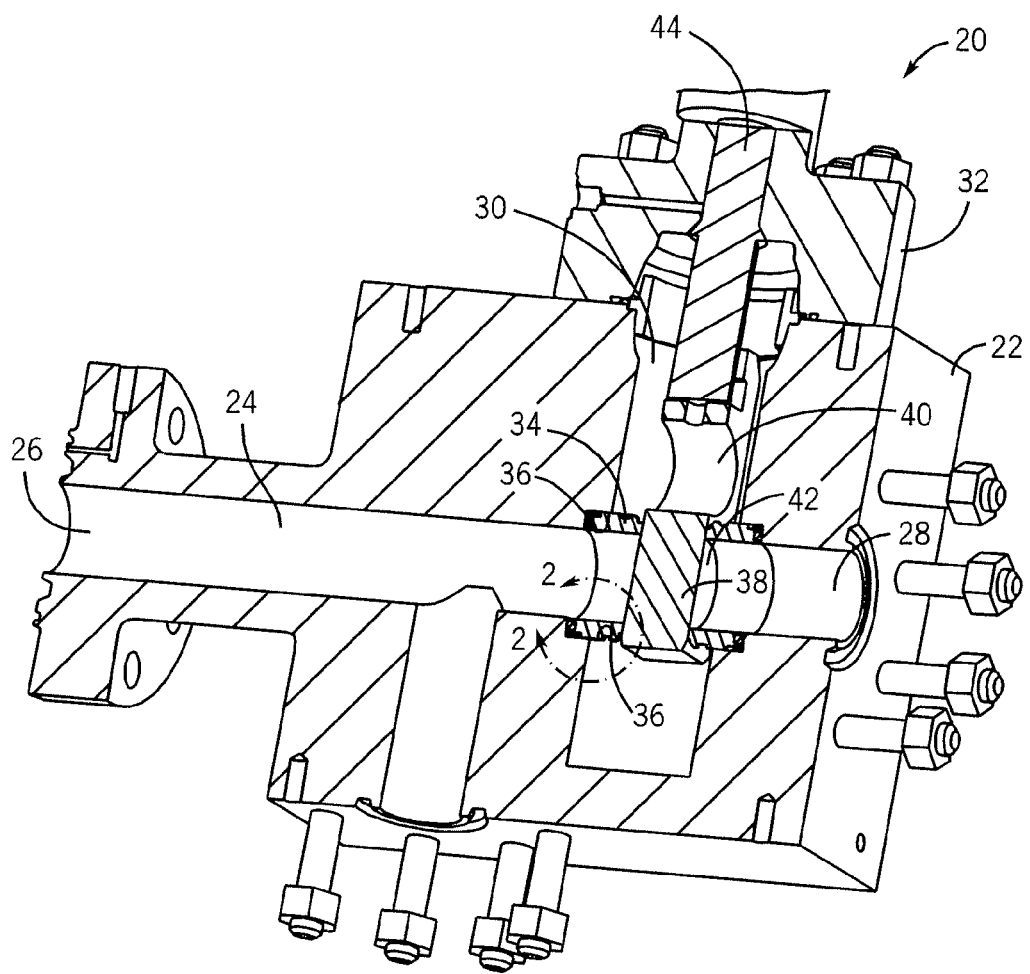
FIG. 1 is a cross-sectional view of a gate valve, in accordance with an exemplary embodiment of the present technique.

Referring now to FIG. 1, the present invention will be described as it might be applied in conjunction with an exemplary technique, in this case a technique for detecting the surface profile of a surface within the bore of a gate valve assembly for controlling the flow of a fluid, such as oil and/or gas, and represented generally by reference numeral 20. In addition, the illustrated embodiment of the gate valve 20 is a grease-less valve. However, the present technique may be used in valves other than gate valves and other than grease-less valves.

In the illustrated embodiment, the gate valve assembly 20 comprises a valve body 22 having a bore 24 extending though the valve body 22. The bore 24 has a first opening 26 and a second opening 28. In this embodiment, the gate valve 20 is a bi-directional valve. Therefore, the first opening 26 may be used as an inlet to the bore 24 in one configuration and as an outlet in another configuration, as can the second opening 28.

In addition, this embodiment of the valve 20 has a valve cavity 30 that is covered by a bonnet 32. A pair of seats 34 extend into the cavity 30 from seat pockets 36 formed on opposite sides of the cavity 30 in the bore 24 through the valve body 22. A gate 38 is housed in the cavity 30 between the seats 34. The gate 38 has an opening 40 and a solid portion 42 that are positioned to control flow through the gate valve 20. When the gate 38 is positioned with the opening 40 aligned with the bore 24, the valve 20 is open and fluids are able to pass through the bore 24 via the opening 40 in the gate 38. When the gate 38 is positioned with the solid portion 42 aligned with the bore 24, the valve 20 is closed and fluids are blocked from flowing through the bore 24 by the solid portion 42 of the gate 38.

The valve 20 also has a valve stem 44 that extends through the bonnet 32 to enable a user to position the gate 38 in either the open or closed configuration. A hand wheel (not shown) or some other actuator may be used to position the valve stem 44. For example, a hydraulic actuator may be used to control the position of the gate 38. An electrical or pneumatic actuator may be used, as well.

Figure 2:
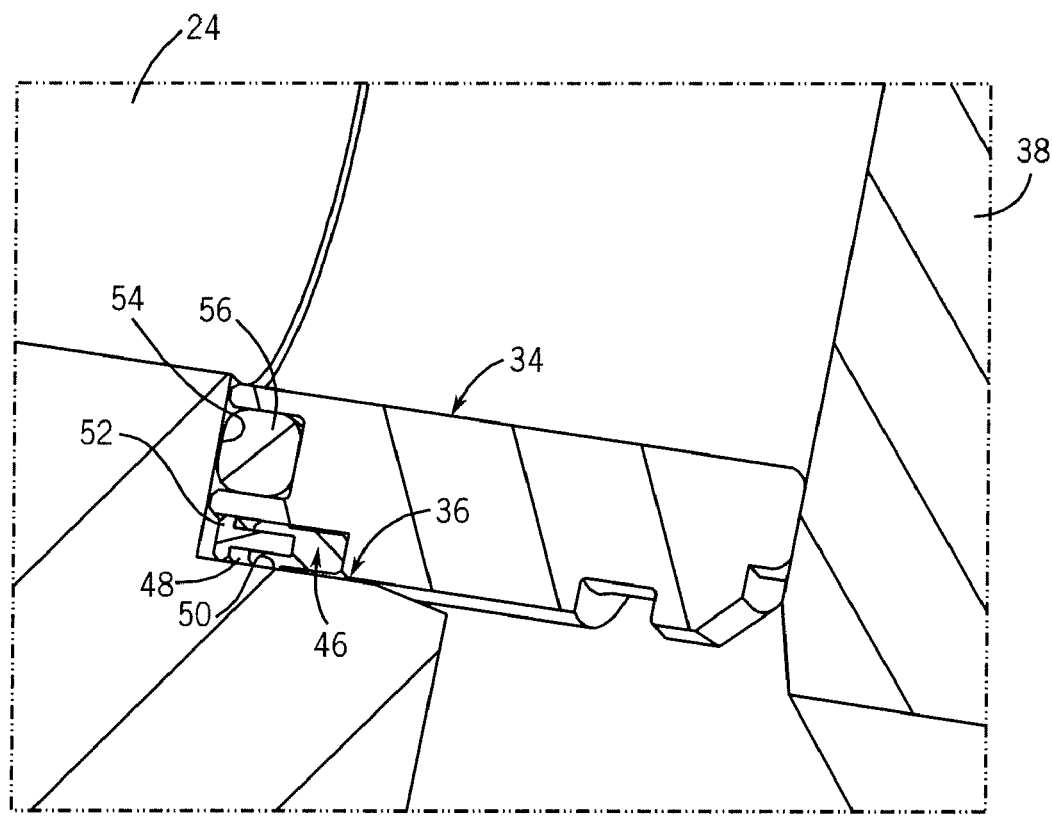
FIG. 2 is a detailed view of a portion of a seat and seat pocket of the gate valve of FIG. 1, in accordance with an exemplary embodiment of the present technique.

Referring generally to FIG. 2, the seat 34 has a seat seal 46 that is used to form a seal between the seat 34 and the seat pocket 36. The seat seal 46 prevents flow from leaking from the bore 24 via the seat 34. In this embodiment, the seat seal 46 has a U-shaped portion 48 with a pair of sealing surfaces 50 that contact the seat pocket 36 on one side and the seat 34 on the opposite side of the seat seal 46. A standoff ring 52 is provided to extend between the back face 54 of the seat pocket 36 and the U-shaped sealing portion 48 of the seat seal 46. When installed in the seat pocket 36, the standoff ring 52 abuts the seat pocket back face 54 and urges the U-shaped sealing portion 48 of the seat seal 46 outward so that the sealing surfaces 50 of the seat seal 46 make contact with the seat pocket 36 and seat 34, respectively. In addition, the seat 34 has a seat spring 56 that urges the seat 34 against the gate 38.

The correspondence between the seat seal 46 and the seat pocket 36 enables a seal to be maintained without the use of grease. However, if the surface profile of the seat pocket 36 is rough or is not round, the sealing surfaces 50 of the seat seal 46 may not maintain a seal. Therefore, leakage from the bore 24 may occur. The surface profile of the seat pocket 36 may be too rough for a proper seal due to chatter from the machining operations used to form the seat pocket 36, incidental damage to the surface finish, or some other cause. Similarly, the surface profile of the seat pocket 36 may have been machined slightly or severely oval, rather than round. The surface profile of the seat pocket 36 may be repaired if it is not sufficiently smooth and/or round. For example, the seat pocket 36 may be machined to re-bore the seat pocket 36.

Figure 3:
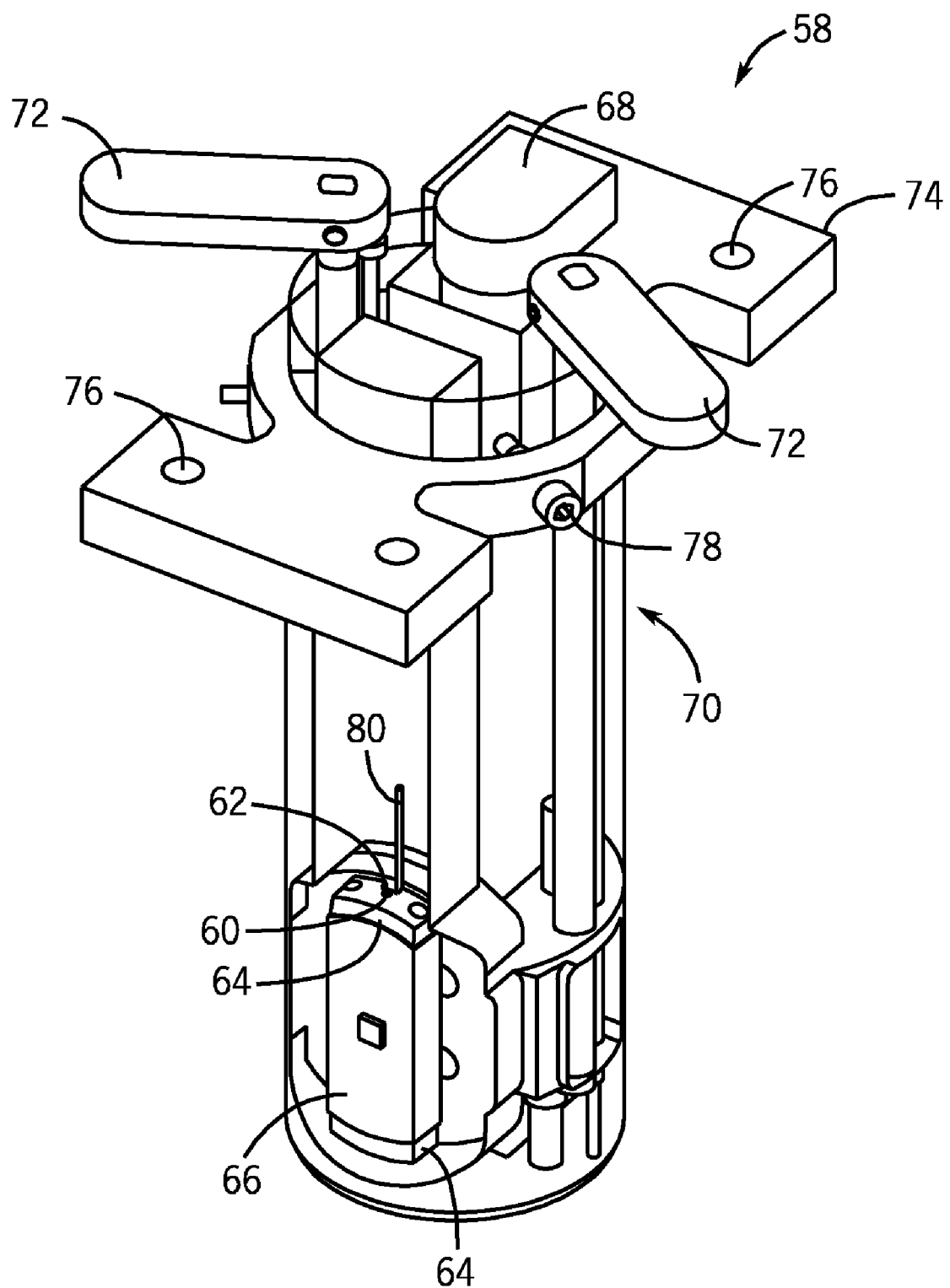
FIG. 3 is a perspective view of a seat pocket inspection tool, in accordance with an exemplary embodiment of the present technique.

Referring generally to FIG. 3, a seat pocket inspection tool 58 is used to detect the surface profile of the seat pocket 36 to establish whether or not the seat pocket 36 is sufficiently smooth and/or round. If the surface profile of the seat pocket 36 is not sufficiently smooth or round, the seat pocket 36 may be repaired to correct the lack of sufficient smoothness or roundness. The seat pocket inspection tool 58 is adapted to provide quantitative data regarding the surface profile of the seat pocket 36. From this data, the degree of smoothness and/or roundness of the seat pocket 36 may be established. For example, the seat pocket inspection tool 58 may provide the user with data regarding specific points on the seat pocket, such as distance from a reference point or the center of the seat pocket 36, or data regarding the seat pocket as a whole or in part, such as a percentage variation in the surface.

The seat pocket inspection tool 58 has a sensor 60 that is adapted to detect the distance between a surface opposite the sensor 60 and a reference point. The reference point may be any point, such as the surface of the sensor 60, a point inside the sensor 60, or the center of the seat pocket 36. Alternatively, the reference point may be another point on the seat pocket 36. In this embodiment, the sensor 60 is used to detect the distance between the seat pocket 36 and the reference point at a plurality of points around the seat pocket 36 so that an overall profile of the surface of the seat pocket 36 may be established.

In the illustrated embodiment, the sensor 60 is a contact sensor that has a probe 62 that is adapted to produce a signal representative of the distance that the probe 62 is extended from the sensor 60. For example, when the sensor 60 is located in the seat pocket 36 of the valve body 22, the probe 62 of the sensor 60 is biased outward to engage the surface of the seat pocket 36. However, a non-contact sensor 60 may be used in other embodiments of the present technique. The sensor 60 and sensor probe 62 are housed within a radial shoe 64.

The data generated by the probe 62 may be configured in a plurality of different ways. For example, the seat pocket inspection tool 58 may be adjusted to identify the signal generated by the probe 62 at the first point of contact as a zero reference point. If the profile of the seat pocket 36 is such that the probe 62 is extended further from the sensor 60 at the next detection point, the signal generated by the probe 62 will reflect the increase in distance that the probe 62 traveled. Similarly, if the profile of the seat pocket 36 is such that the probe 62 is retracted into the sensor 60 at another detection point, the signal generated by the probe 62 will reflect this decrease in travel of the probe 62.

The radial shoe 64 housing the sensor 60 is mounted in a rotatable body 66 adapted to rotate the sensor 60 around the seat pocket 36 of the valve body 22 to obtain data at a plurality of points around the seat pocket 36. In the illustrated embodiment, the seat pocket inspection tool 58 has an electric motor 68 that is coupled to the rotatable body 66. The electric motor 68 is adapted to rotate the rotatable body 66 so that the sensor 60 is rotated around the entire cylinder of the seat pocket. In the illustrated embodiment, the seat pocket inspection tool 58 is configured to control the electric motor 68 so that the sensor 60 is stepped around the seat pocket to take periodic measurements, rather than rotating the sensor 60 continuously. However, the seat pocket inspection tool 58 may be configured to rotate the sensor 60 in a continuous manner.

By detecting the distance between the seat pocket 36 and a reference point at a plurality of points around the seat pocket, a profile of the surface of the seat pocket 36 may be established. The distance between the sensor 60 and the reference point should remain the same as the sensor 60 travels around the seat pocket if the surface of the seat pocket is smooth and the seat pocket is round. However, if there is roughness in the surface of the seat pocket or the seat pocket is not round, the distance between the sensor 60 and the reference point will change as the sensor 60 travels around the seat pocket. As noted above, the data detected by the seat pocket inspection tool 58 may be presented for each point on the seat pocket 36 or for the seat pocket 36 in whole or in part. For example, the percent variation in the seat pocket 36 may be established for the seat pocket 36 as a whole based on the data collected at a plurality of points over the surface of the seat pocket 36.

In the illustrated embodiment, the rotatable body 66 may be shifted between a retracted position and an extended position to facilitate installation of the seat pocket inspection tool 58 in the valve cavity 30 of the valve body 22. In the retracted position, the seat pocket inspection tool 58 may be disposed in the valve cavity 30 of the valve body 22. In the extended position, the rotatable body 66 is extended from the main body 70 of the seat pocket inspection tool 58 to position the probe 62 into the seat pocket 36 of the valve to be inspected. In the illustrated embodiment, the seat pocket inspection tool 58 has a pair of handles 72 that are operated to position the tool 58 between the retracted position and the extended position. In addition, the tool 58 has a support plate 74 that is securable to the valve to be inspected. In this embodiment, the support plate 74 has a series of holes 76 through which threaded connectors may be inserted through the support plate 74 into the valve, securing the support plate 74 to the valve and aligning the seat pocket inspection tool 58 within the valve body. In addition, in this embodiment, a series of cap screws 78 are used to secure the main body 70 of the seat pocket inspection tool 58 to the support plate 74. This configuration enables some adjustment of the tool 58 within the valve cavity of a valve so that the sensor 60 is positioned at the correct height within the seat pocket 36 of the valve 20.

The seat pocket inspection tool 58 is adapted to transmit its data to a processor-based device, such as a computer. A wire 80 is provided to couple power to the sensor 60 and to transmit data from the sensor 60. The wire 80 is coupled to a connector (not shown) that may be used to couple the seat pocket inspection tool 58 to the processor-based device.

Figure 4:
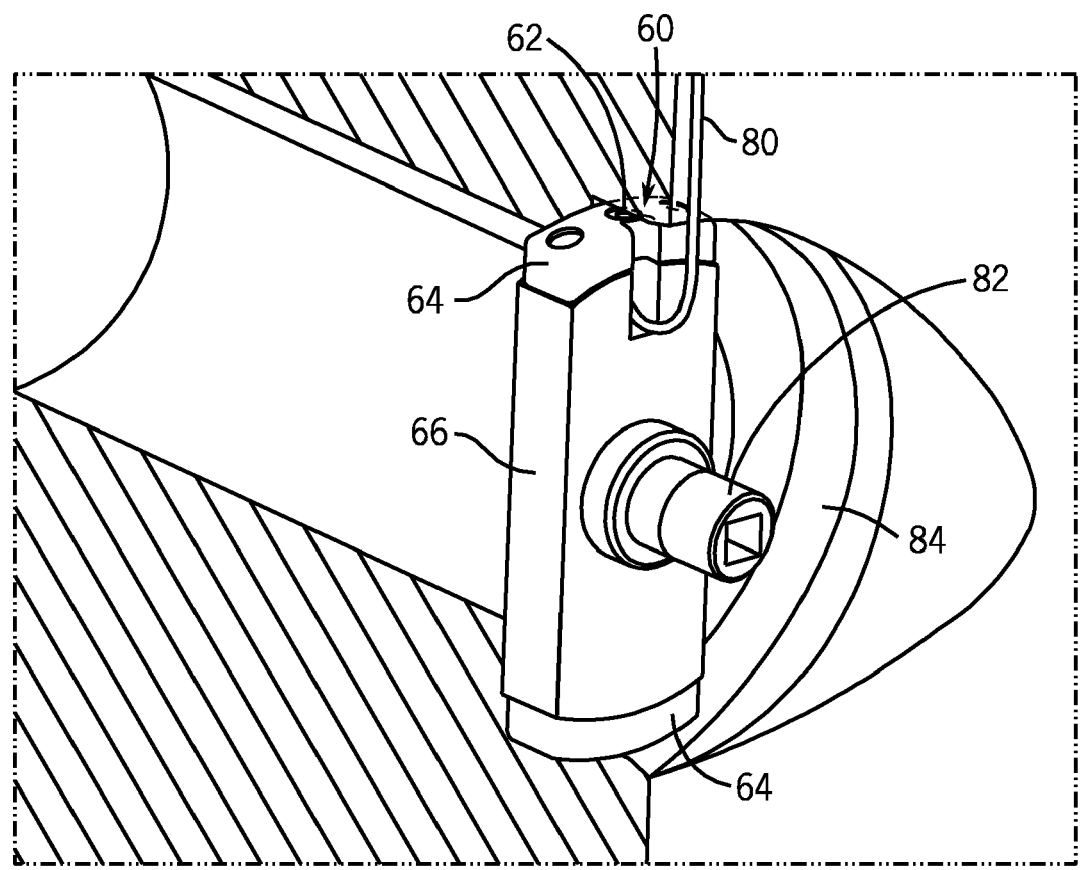
FIG. 4 is a perspective view of a sensor of the seat pocket inspection tool within the seat pocket of the gate valve of FIG. 1, in accordance with an exemplary embodiment of the present technique.

Referring generally to FIG. 4, a detailed perspective view of the orientation of the sensor 60 within the seat pocket 36 of the valve body 22 is presented. As will be discussed in more detail below, the rotatable body 66 has a square drive receptacle 82 that is used to couple the rotatable body 66 to a drive system powered by the electric motor 68. The rotatable body 66 is rotated within the seat pocket 36, as represented by arrow 84, to rotate the sensor 60 around the seat pocket 36.

Figure 5:
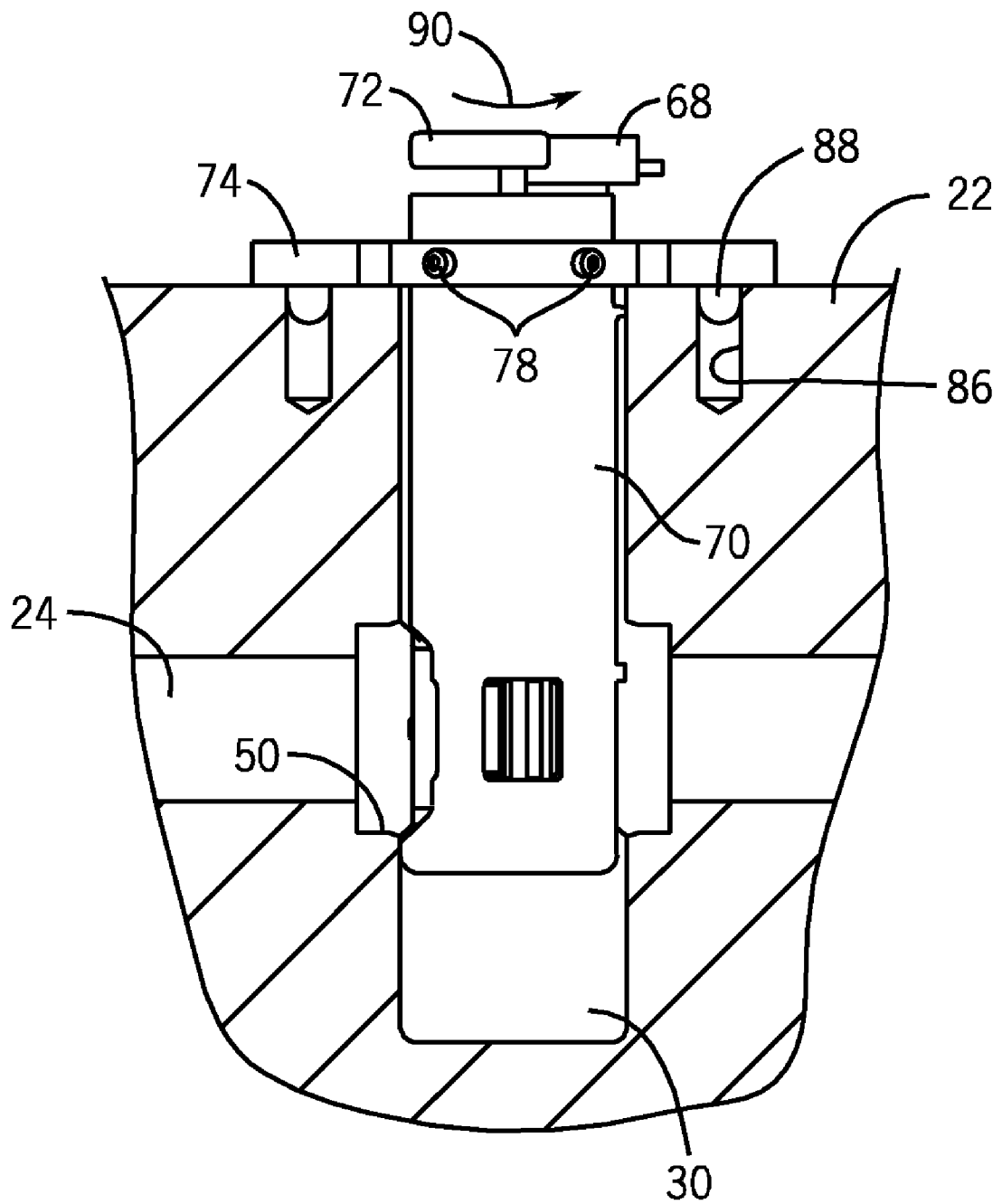
FIG. 5 is a partial cross-sectional view of the seat pocket inspection tool installed in the valve body with the seat pocket inspection tool rotating body/sensor in the retracted position, in accordance with an exemplary embodiment of the present technique.

Referring generally to FIG. 5, the seat pocket inspection tool 58 is inserted into the valve cavity 30 of the valve body 22, as noted above. In this embodiment, the support plate 74 is secured to threaded holes 86 in the valve body 22 using locator plugs 88. The rotatable body 66 is retracted into the seat pocket inspection tool 58. Accordingly, the handles 72 are oriented forward. To extend the rotatable body 66 into the seat pocket 36 of the valve body 22, the handles 72 are rotated rearward, as represented generally by arrow 90.

Figure 6:
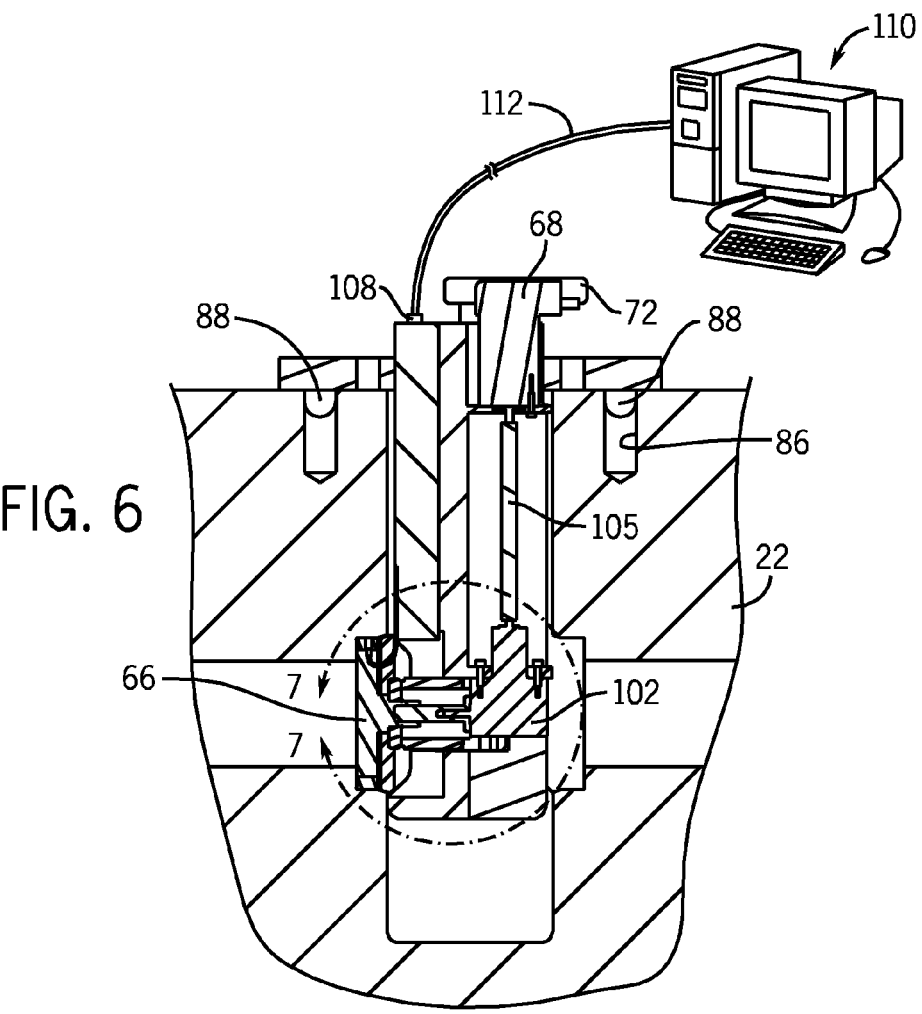
FIG. 6 is a cross-sectional view of the seat pocket inspection tool installed in the valve body with the seat pocket inspection tool rotating body/sensor in the extended position, in accordance with an exemplary embodiment of the present technique.
Figure 7:
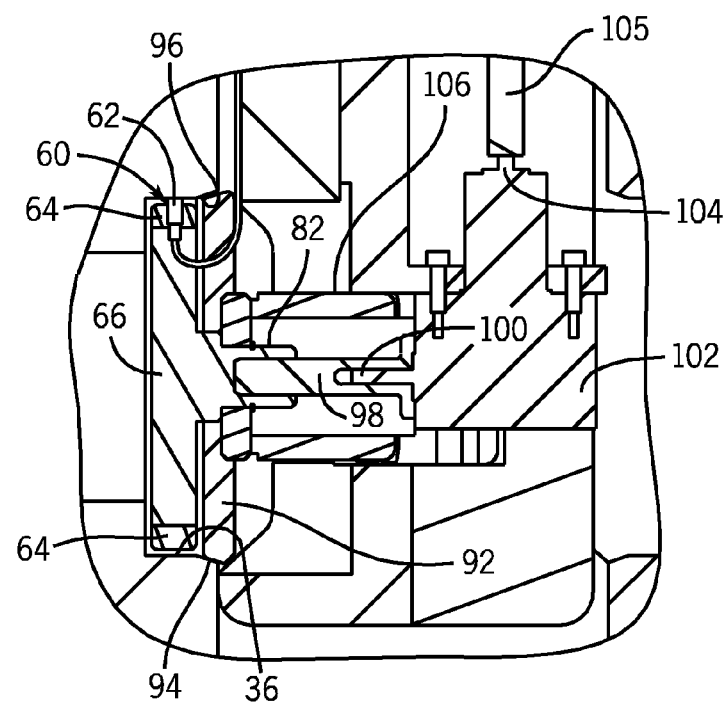
FIG. 7 is a detailed view of the seat pocket inspection tool taken generally along line 7-7 of FIG. 6, in accordance with an exemplary embodiment of the present technique.

Referring generally to FIGS. 6 and 7, the rotatable body 66 is extended into the seat pocket 36 of the valve body 22 to enable the sensor 60 of the seat pocket inspection tool 58 to be oriented directly opposite the surface of the seat pocket 36. The probe 62 of the sensor 60 is biased outward to enable the probe 62 to obtain surface profile data from the seat pocket 36. The rotatable body 66 is centered in the seat pocket 36 by a stop plate 92. The stop plate 92 has a tapered surface 94 that abuts a tapered surface 96 portion of the seat pocket 36, which centers the rotatable body 66 in the seat pocket 36.

The square drive receptacle 82 of the rotatable body 66 is disposed over a square shaft drive 98 to enable the rotatable body 66 to telescope with the square shaft drive 98 as the rotatable body is extended and retracted. The square shaft drive 98 is secured to an output shaft 100 of a right-angle gear drive 102. The right-angle drive 102 has an input shaft 104 that is coupled to the electric motor 68 by a connecting rod 105. The right-angle gear drive 102 converts the vertical rotation movement produced by the electric motor 68 into a horizontal rotational movement of the rotatable body 66. Here, the electric motor 68 rotates the connecting rod 105. The connecting rod 105, in turn, rotates the input shaft 104 of the right-angle gear drive 102, which drives the output shaft 100 of the right-angle gear drive 102. The output shaft 100 rotates the square shaft drive 98, which rotates the square drive receptacle 82, rotating the rotatable body 66.

The rotatable body 66 is extended and retracted by sliding the square-drive receptacle 82 of the rotatable body 66 over the square drive shaft 98. In particular, a spring bar 106 is used to reposition the rotatable body 66. The spring bar 106 is biased to drive the rotatable body 66 outward, but its movement is controlled by the handles 72.

In the illustrated embodiment, the seat pocket inspection tool 58 has an electrical connector 108 that enables the tool 58 to be connected to a processor-based device 110 using a cable 112. In the illustrated embodiment, the processor-based device 110 is a desktop computer. However, other processor-based devices may be used, such as a personal digital assistant.

The processor-based device 110 is adapted to receive data from the seat pocket inspection tool 58 and present it in a manner that may be understood by a user. The data produced by the sensor 60 is transmitted to the computer via the cable 112. In the illustrated embodiment, the computer 110 processes the data and displays the results on a monitor. For example, the computer may list the distance between a point on the seat pocket and a reference point for a plurality of points around the cylinder of the seat pocket. If there is variation in the distances at the plurality of points, this is an indication that the seat pocket is not round or that the surface of the seat pocket is uneven.

Figure 8:
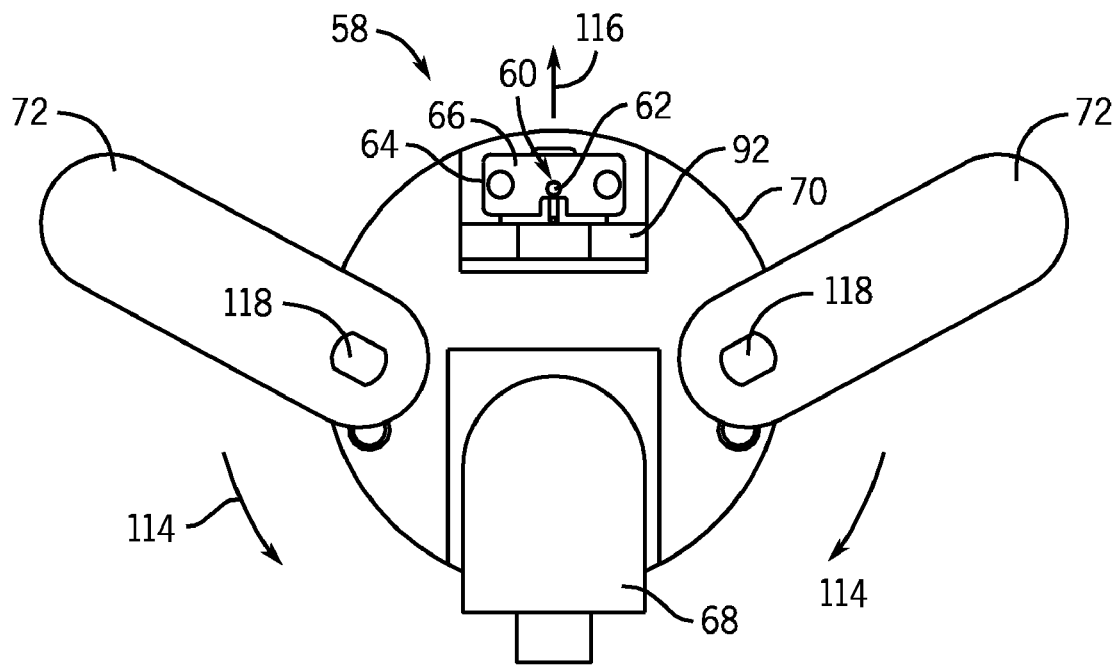
FIG. 8 is a top view of the seat pocket inspection tool installed in the valve body with the seat pocket inspection tool handles and rotating body/sensor in the retracted position, in accordance with an exemplary embodiment of the present technique.
Figure 9:
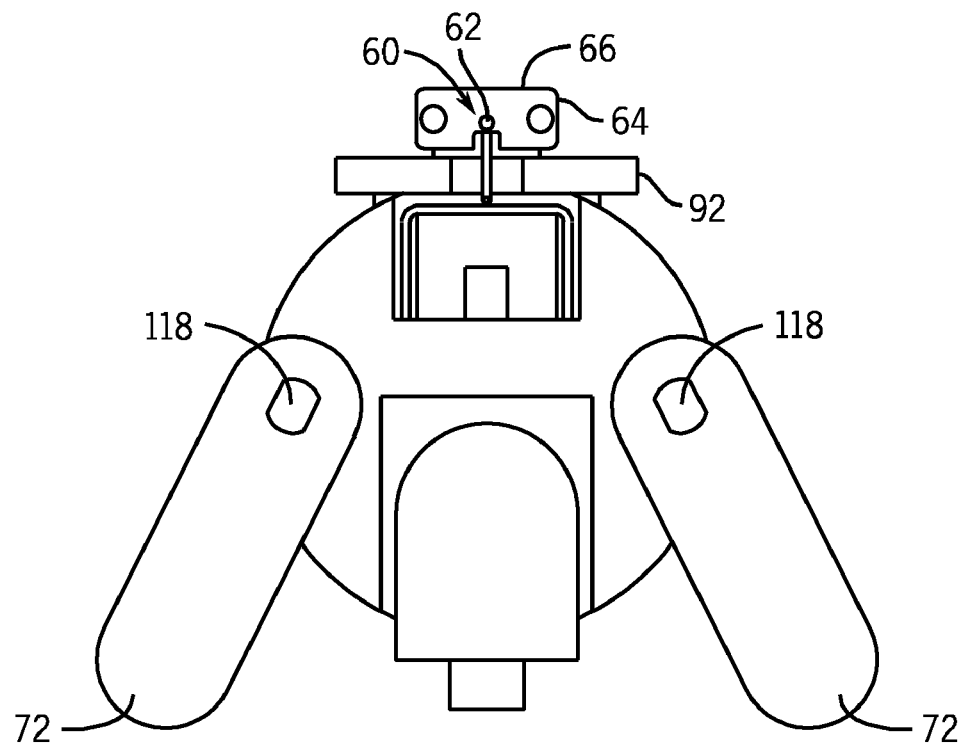
FIG. 9 is a top view of the seat pocket inspection tool installed in the valve body with the seat pocket inspection tool handles and rotating body/sensor in the extended position, in accordance with an exemplary embodiment of the present technique.

Referring generally to FIGS. 8 and 9, a user retracts and extends the rotatable body 66 by positioning the handles 72 of the seat pocket inspection tool 58. Each handle 72 is coupled to a tie rod 118 that is rotated whenever the handles 72 are repositioned. The rotation of the tie rods 118 enables the rotatable body 66 to be extended and retracted. In FIG. 8, the handles 72 and the rotatable body 66 are presented in their retracted positions. By repositioning the handles 72 from their retracted position to their extended position, i.e., repositioning the handles 72 from the front of the seat pocket inspection tool to the rear, as represented by arrows 114, the rotatable body 66 is driven forward, as represented by arrow 116.

Figure 10:
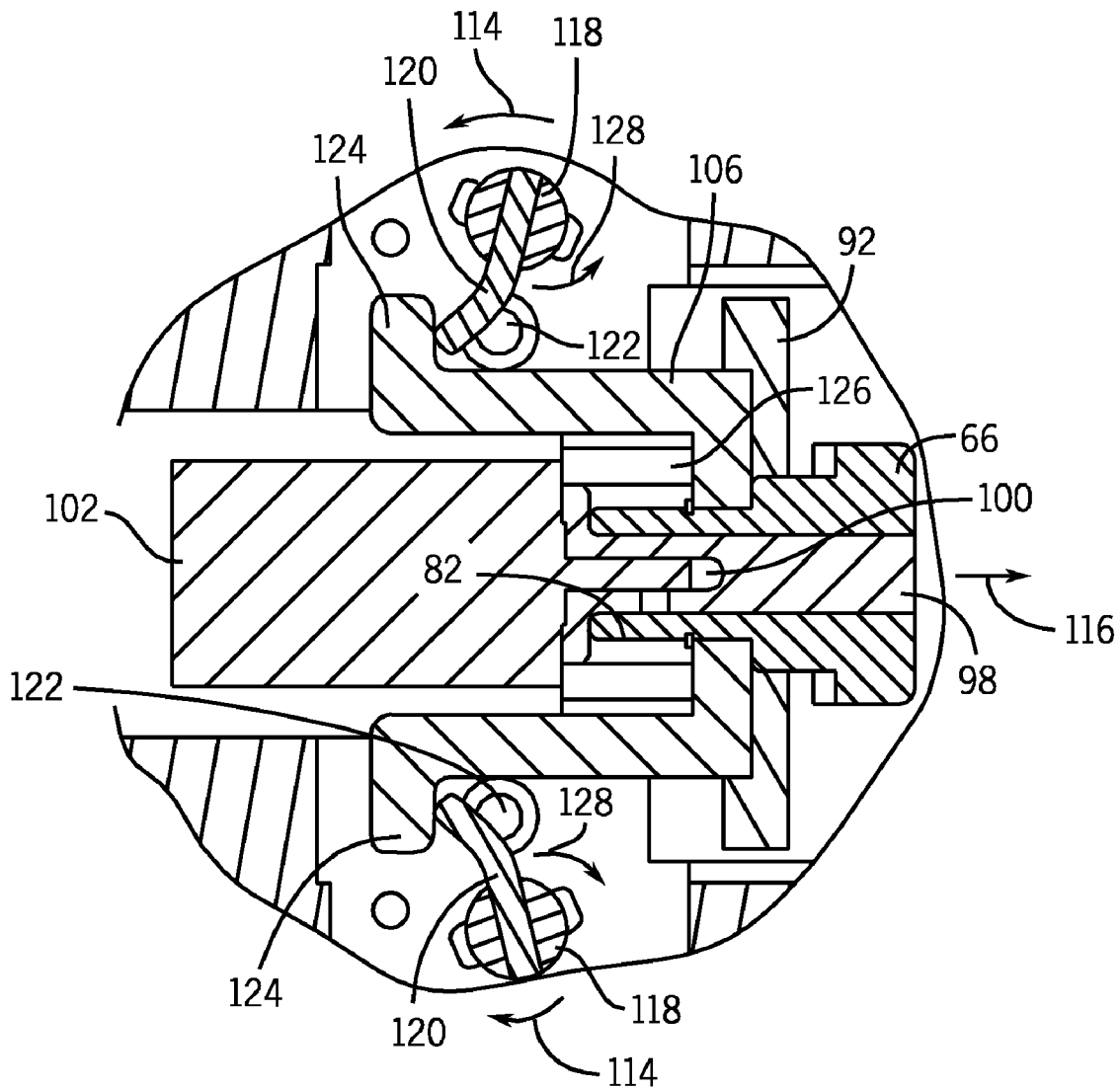
FIG. 10 is a detailed cross-sectional view of the seat pocket inspection tool, in accordance with an exemplary embodiment of the present technique.

Referring generally to FIG. 10, the handles 72 are coupled by tie rods 118 to stop paddles 120, which control movement of the spring bar 106 and, thus, the rotatable body 66. The stop paddles 120 may be maintained in both a retracted position and an extended position by detent pins 122. In FIG. 10, the stop paddles 120 are shown in the retracted position. The stop paddles 120 abut shoulders 124 of the spring bar 106. The spring bar 106 is biased outward by a spring 126, thereby urging the rotatable body 66 outward into the extended position. In the illustrated embodiment, the spring 126 is a wave spring. In the retracted position shown here, the spring 126 is compressed by the spring bar 106 and maintained in compression by the detent pins 122. The detent pins 122 hold the stop paddles 120 in abutment against the shoulders 122 of the spring bar 106, preventing the spring 106 from driving the spring bar 106 outward.

The force exerted by the detents 62 may be overcome with manual force. As the handles 72 are repositioned from their retracted position to their extended position, as represented by arrows 114, the tie rods 118 rotate the stop paddles 120 forward, as represented by arrows 128. The force of the spring 106 drives the spring bar 106 outward, thereby driving the rotatable body 66 outward, as represented by arrow 116. The detents 122 prevent the stop paddles 120 from returning to the retracted position without use of manual force.

While only certain features of the invention have been illustrated and described herein, many modifications and changes will occur to those skilled in the art. It is, therefore, to be understood that the appended claims are intended to cover all such modifications and changes as fall within the true spirit of the invention. For example.

The invention claimed is:

1. A valve body seat pocket inspection tool, comprising:
   a sensor adapted to produce a signal representative of distance between an external surface and a reference point; and
   an apparatus adapted to position the sensor from a retracted position to an extended position within a portion of a bore of a valve body defined by a seat pocket;
   a support system adapted to position the valve body seat pocket inspection tool within a valve body cavity so that the sensor is disposed within the portion of the bore of the valve that is defined by the seat pocket when the sensor is extended, wherein the valve body seat pocket inspection tool comprises a member with a tapered surface adapted to abut a corresponding tapered surface of the bore of the valve body when the sensor is extended into the portion of the bore of the valve body that is defined by the seat pocket.

2. A valve body seat pocket inspection tool, comprising:
   a sensor adapted to produce a signal representative of distance between an external surface and a reference point, wherein the sensor is a contact sensor and the contact sensor comprises a probe that is biased outward to contact the external surface; and
   an apparatus adapted to position the sensor from a retracted position to an extended position within a portion of a bore of a valve body defined by a seat pocket.

3. A valve inspection tool, comprising:
   a sensor adapted to produce a signal representative of distance between an external surface and a reference point, wherein the sensor is a contact sensor and the contact sensor comprises a probe that is biased outward to contact the external surface; and
   a drive system adapted to rotate the sensor around a portion of a bore of a gate valve defined by a seat pocket to enable the sensor to engage a plurality of points on the seat pocket, wherein the signal representative of distance between an external surface and a reference point is a signal representative of distance between a point on the seat pocket and a reference point.

4. The inspection tool as recited in claim 3, comprising:
   an apparatus adapted to extend the sensor from a retracted position within a valve body cavity to an extended position within the portion of the bore of the gate valve defined by the seat pocket.

5. The inspection tool as recited in claim 4, comprising:
   a support system adapted to position the inspection tool within the valve body cavity so that the sensor is disposed within the portion of the bore of the gate valve that is defined by the seat pocket when the sensor is extended.

6. The inspection tool as recited in claim 3, comprising a rotatable body adapted to house the sensor, the rotatable body being in telescopic engagement with a rotatable member coupled to a prime mover of the drive system.

7. The inspection tool as recited in claim 3, comprising a processor-based system adapted to provide a distance between the external surface and the reference point in a user recognized form based on the signal representative of distance between an external surface and a reference point.

8. A valve body seat pocket inspection tool, comprising:
   a sensor adapted to produce a signal representative of distance between an external surface and a reference point;
   an apparatus adapted to position the sensor from a retracted position to an extended position within a portion of a bore of a valve body that is defined by a seat pocket, whereupon the external surface is a point on the seal surface of the seat pocket, and the signal representative of distance between an external surface and a reference point is a signal representative of distance between a point on the seal surface of the seat pocket and a reference point; and
   a drive system adapted to rotate the sensor around the portion of the bore of the valve body that is defined by the seat pocket to produce the signal representative of distance between a point on the seal surface of the seat pocket and a reference point at a plurality of points on the seat pocket to enable the ovality of the seal surface of the seat pocket to be established.

9. The valve body seat pocket inspection tool as recited in claim 8, comprising a processor-based system adapted to produce a distance between the point on the seat pocket and a reference point in a user-recognizable form based on the signal representative of distance between a point on the seat pocket and a reference point.

10. A method for inspecting a seat pocket of a valve body, comprising:
    disposing a valve body seat pocket inspection tool within a valve cavity of the valve body;
    extending a sensor adapted to produce a signal representative of distance between an external surface and a reference point into a bore of the valve defined by the seat pocket;
    rotating the sensor around the bore of the valve body defined by the seat pocket to produce a signal representative of distance between a point on the seat pocket and a reference point at a plurality of points on the seat pocket; and
    establishing the ovality of the seat pocket based on the signals representative of distance between a point on the seat pocket and a reference point produced at a plurality of points on the seat pocket.

* * * * *